United States Patent [19]

Williams

[11] 3,998,566
[45] Dec. 21, 1976

[54] BORING HEADS

[75] Inventor: Frederick Gordon Williams, Looe, England

[73] Assignee: Toolmasters and Technical Developments (Birmingham) Limited, Birmingham, England

[22] Filed: Dec. 2, 1974

[21] Appl. No.: 528,913

[30] Foreign Application Priority Data
Dec. 8, 1973 United Kingdom ............ 57003/73

[52] U.S. Cl. .............................. 408/226; 408/227; 408/231; 408/705
[51] Int. Cl.² ........................................ B23G 77/04
[58] Field of Search .......... 408/705, 226, 231, 232, 408/233; 90/11 A

[56] References Cited
UNITED STATES PATENTS

| 1,300,325 | 4/1919 | Baumann | 408/705 X |
| 1,881,024 | 10/1932 | Lang | 408/226 X |
| 2,964,833 | 12/1960 | Novkov | 29/96 R X |
| 3,348,434 | 10/1967 | Plummer | 408/705 X |
| 3,738,765 | 6/1973 | Mater | 408/705 X |
| 3,762,828 | 10/1973 | Faber | 408/705 X |

FOREIGN PATENTS OR APPLICATIONS 1,009,889  6/1957  Germany ............ 408/226

Primary Examiner—Leonidas Vlachos
Attorney, Agent, or Firm—Friedman, Goodman & Teitelbaum

[57] ABSTRACT

A deep-hole boring head comprising a body member arranged to support a boring tool at one end and to be attached to a boring bar at the other end, the body member being provided with a number of guidance members in strip form adjustably mounted thereon and arranged during use of the boring head to contact the surface of the hole bored by the boring tool so as to guide the tool during the boring of a deep hole, and adjustment means connected with the guidance members and arranged, on movement of the guidance members in directions substantially parallel to their longitudinal axes, to adjust the radial distances of the guidance members from the center line of the hole to be bored.

1 Claim, 10 Drawing Figures

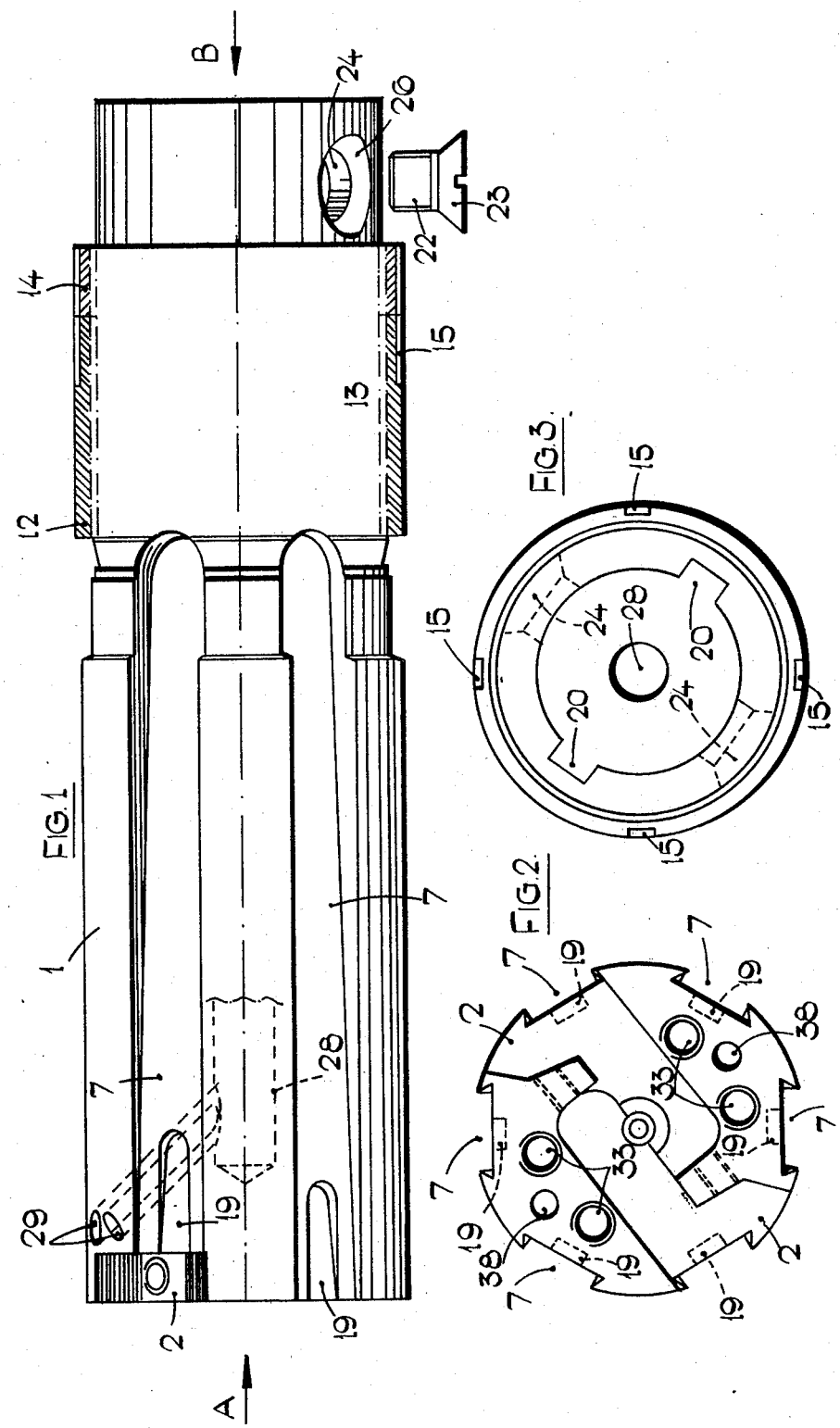

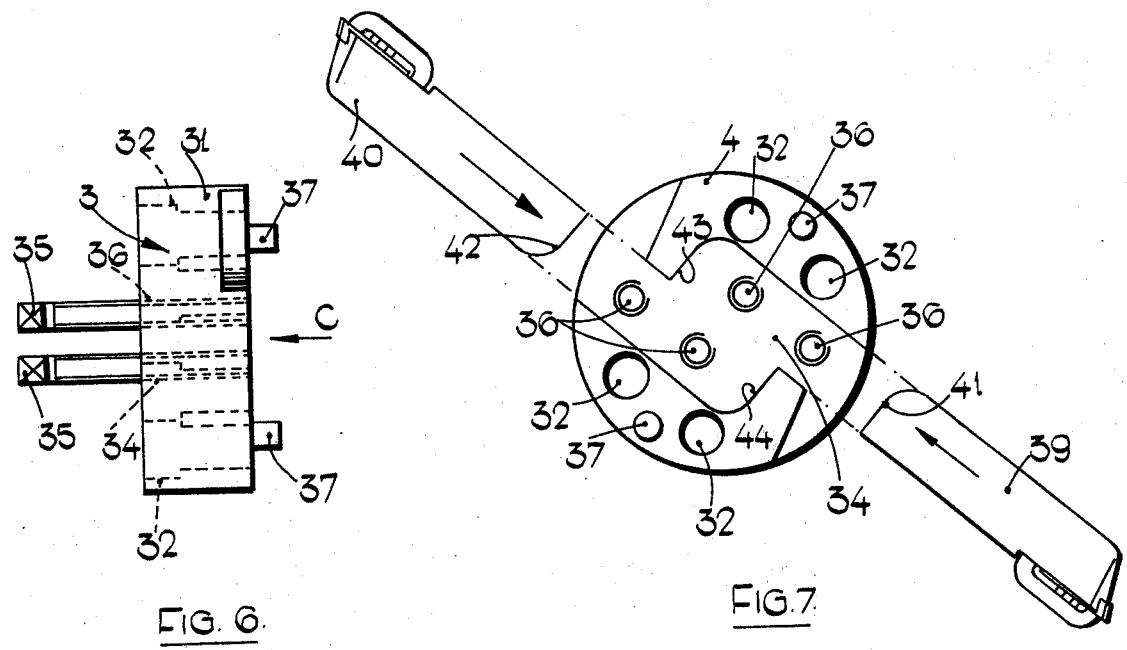

BORING HEADS

BACKGROUND OF THE INVENTION

This invention relates to boring heads and in particular to such heads for boring deep holes.

The term "boring" as used throughout this specification should be interpreted to include not only a simple boring operation in which a hole is bored in a formerly solid workpiece but also a counterboring operation in which an existing hole is increased in diameter. References to "boring head" and "boring tool" should similarly be interpreted to include a head and tool suitable for both simple boring and counterboring.

When boring a deep hole a boring tool is conventionally carried in a boring head which is secured to a long boring bar. This bar may be rotated by such means as an electric or hydraulic motor and advanced within a stationary workpiece as the boring operation progresses. Alternatively the workpiece may be rotated and the boring bar held stationary or both the workpiece and boring bar may be rotated in the same direction at different speeds or in opposite directions. Using one of these procedures holes in excess of thirty feet deep can be bored.

One of the main problems encountered in such a deep boring operation is the accurate locating and guiding of the boring tool.

It is an object of the present invention to provide a deep hole boring head which overcomes the above problem in an efficient and simple manner.

SUMMARY OF THE INVENTION

According to the invention we provide a deep-hole boring head comprising a body member arranged to support a boring tool at one end and to be attached to a boring bar at the other end, the body member being provided with a number of guidance members adjustably mounted thereon and arranged during use of the boring head to contact the surface of the hole bored by the boring tool so as to guide the tool during the boring of a deep hole, and adjustment means connected with the guidance members for adjusting the radial distances of the guidance members from the centre line of the hole to be bored.

When it is intended to use a deep boring head in accordance with the present invention to bore a deep hole, a different tool and head may first be used to provide a pilot hole of the required diameter which is deep enough to take the boring head in accordance with the present invention, the boring head in accordance with the present invention is then inserted into this pilot hole and the radial position of the guidance members adjusted in order to ensure contact with the surface of the pilot hole. The boring operation is then continued using the deep boring head which is guided by the guidance members.

Alternatively, a deep hole can be bored by a boring head in accordance with the present invention without the use of a different tool and head to drill a pilot hole.

As indicated above a boring head in accordance with the present invention may be used to undertake a simple boring or counterboring operation. If desired these two operations can be carried out simultaneously by providing the boring head with a tool for boring the initial hole and one or more further tools positioned on the boring bar side of the previously referred to tool for counterboring the initial hole.

The guidance members may be in strip form and extend in directions substantially parallel to the intended direction of boring. In another construction the guidance members may extend in directions inclined to the intended direction of boring. For example, the guidance members may be in the form of part helical strips circumferentially positioned on the body member so that a line drawn on the outer surface of the body member parallel to the intended direction of boring touches or cuts at least two of the guidance members.

Preferably the guidance members are mounted on the body member so that movement of the guidance members in directions substantially parallel to their longitudinal axes results in the variation of the radial distances of the guidance members from the centre line of the hole to be bored.

Preferably the guidance members each comprise a strip of low-friction material mounted in a dove-tail cross-section tapered shoe which is slidable in a dove-tail cross-section slot in the body member, the slot being tapered so that its depth increases from one end to the other.

Preferably the slots are tapered so that their depths decrease towards their ends adjacent to the boring tool. This allows the radial distances of the guidance members from the centre line of the hole to be increased simply by pushing the guidance members along the slots from the end of the body member remote from the boring tool.

In an arrangement described in the preceding paragraph the adjustment means may comprise an internally threaded sleeve which encircles and is in screw-threaded engagement with a portion of the body member remote from the boring tool. The sleeve is arranged to contact the ends of the guidance members remote from the boring tool so that rotation of the sleeve in one direction results in the axial movement of the sleeve towards the boring tool and consequent longitudinal and radially outward movement of the guidance members.

The adjustment means includes a locking means to lock the sleeve in the required axial position on the body member during use of the boring head in order to ensure that the guidance members remain in contact with the surface of the hole bored by the boring tool. This locking means may conveniently take the form of a locking ring which is in screw-threaded engagement with the threaded portion of the body member. The locking ring is screwed up into contact with the sleeve which is then rotated in the reverse direction slightly in order to lock the sleeve and locking ring securely in position on the body member.

The boring head may be secured to the boring bar in a variety of ways. For example, the end of the body member which is to be secured to the boring bar may be provided with a socket arranged to receive a spigot provided on the end of the boring bar.

The socket may be provided with two axially extending keyways circumferentially spaced 180 degrees apart and arranged to receive two co-operating axially extending keys provided on the boring bar spigot thus preventing relative rotation between the boring bar and head.

In such an arrangement the boring head may be located axially on the boring bar by two countersunk set screws provided with conical heads, the screws being arranged to extend with clearance through two holes provided in the body member and to engage screw-threaded blind bores provided in the boring bar spigot. By arranging the counter-sinking of the holes to be eccentric relative to the holes themselves, tightening of the set screws results in a wedging action taking place between the heads of the set screws and the counter-sinking which displaces the boring head towards the boring bar and draws the base of the boring head socket up against the end of the boring bar spigot.

As an alternative to the set-screw arrangement described above, the boring head may be provided with a socket which is internally screw-threaded and is arranged to receive the end of the boring bar which is provided with a corresponding screw-threaded portion. This arrangement takes longer to assemble and dismantle than the set-screw arrangement and thus results in greater 'down-time' when a change in boring head is required.

In deep boring machines it is conventional to provide a drilling down the centre of the boring bar and boring head through which a liquid which cools and lubricates the boring operation is passed. In order to seal the joint between the boring head and bar against the escape of this liquid an O-ring may be provided between the end of the boring bar and the base of the boring head socket.

BRIEF DESCRIPTION OF THE DRAWINGS

One embodiment of the invention will now be described by way of example with reference to FIGS. 1 to 10 of the accompanying drawings in which:

FIG. 1 is a side view of part of a boring head embodying the invention for use in counterboring deep holes;

FIG. 2 is an end view in the direction of the arrow A of FIG. 1;

FIG. 3 is an end view in the direction of the arrow B of FIG. 1;

FIG. 6 is a side view of a tool clamping head for use in the boring head shown in FIG. 1;

FIG. 7 is an end view in the direction C of FIG. 6;

DESCRIPTION OF THE PREFERRED EMBODIMENT

Figure 8:
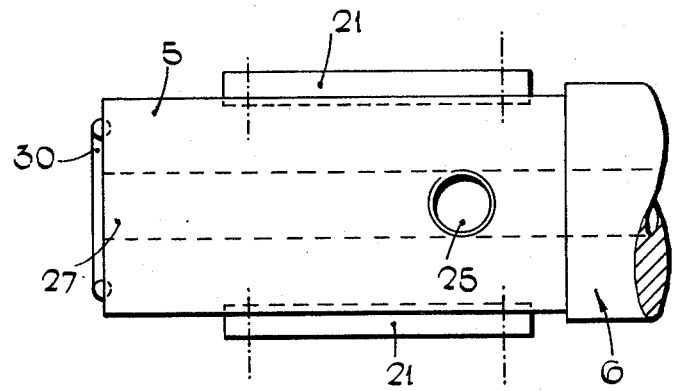
FIG. 8 is a side view of the end of a boring bar for use with the boring head shown in FIG. 1.

Referring to the drawings, a deep hole boring head for use in counterboring deep holes comprises a generally cylindrical body member 1 provided with a recess 2 at one end thereof in which a counterboring tool or tools may be clamped by a clamping head 3, shown in FIGS. 6 and 7, and a socket 4 at the other end thereof arranged to receive a spigot 5 provided on the end of an associated boring bar 6, shown in FIG. 8.

The body member 1 is provided with a number of circumferentially spaced dove-tail cross-section slots 7 which extend axially relative to the boring head. As can be seen from FIG. 1 the slots 7 are tapered so that their depth decreases towards the end adjacent to the tool recess 2.

Figure 4:
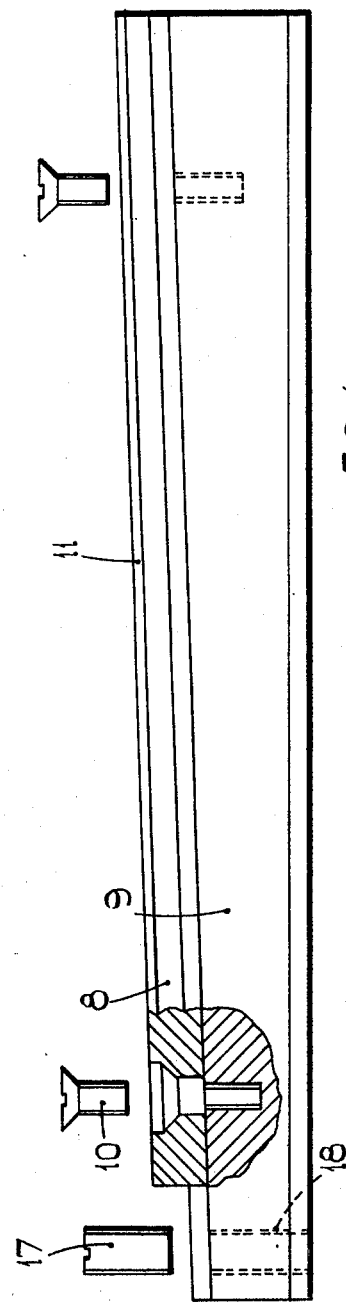
FIGS. 4 and 5 are side and end views respectively of a guidance member for use in the boring head shown in FIG. 1.
Figure 5:
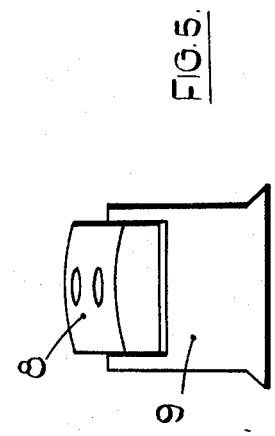

In each of these slots 7 is disposed a guidance member, shown in FIGS. 4 and 5, in the form of a bearing strip 8 made from low-friction material mounted in a tapered metal shoe 9 of dove-tail cross-section. The bearing strips 8 are secured to the shoes 9 by countersunk screws 10.

As will be evident from the drawings, by sliding the shoes 9 along the slots 7 the radial distances of the outer surfaces 11 of the bearing strips 8 from the longitudinal axis XX of the boring head can be varied. The radial position of the outer surfaces 11 of the bearing strips should be adjusted so that the bearing strips make rubbing contact with the surface of the hole counterbored by the counterboring tool or tools. In order to ensure the correct location of the tool or tools throughout an entire counterboring operation it may be necessary from time to time to cease counterboring, withdraw the head from the counterbore and re-adjust the radial position of the bearing strips.

In order to adjust the position of the shoes 9 within the slots 7, an internally screw-threaded sleeve 12 is provided which encircles and is in screw-threaded engagement with a portion 13 of the body member remote from the tool or tools. The sleeve 12 is arranged to contact the adjacent ends of the shoes 9 in the slots 7, so that rotation of the sleeve in one direction results in the axial displacement of the sleeve towards the tool or tools and the consequent axial and radially outward movement of bearing strip 8. An internally screw-threaded locking ring 14 is also provided for engagement with the screw-threaded portion 13 of the body member. The locking ring 14 enables the sleeve 12, and hence the bearing strips 8, to be locked in any desired position during operation of the boring head by screwing the locking ring into contact with the end of the sleeve 12 and then rotating the sleeve 12 slightly in the reverse direction in order to lock the sleeve and ring securely together. The sleeve 12 and ring 14 are provided with circumferentially spaced depressions 15 and 16 respectively to facilitate their rotation.

In order to ensure that the bearing strips and shoes will not be left behind in the hole when the boring head is withdrawn, each shoe 9 is provided with a grub screw 17 which extends through a screw-threaded bore 18. After the bearing strip 8 has been located at the correct radial position by the sleeve 12, each of the grub screws 17 is brought into contact with a more steeply tapered portion 19 provided in the base of each slot at the end thereof adjacent the tool or tools. This prevents the friction between the bearing strips and the surface of the hole causing the bearing strips and shoes to be withdrawn from the slots when the boring head is withdrawn from the hole.

The boring head is located against rotation on the boring bar by two axially extending circumferentially spaced keyways provided in the socket 4. These keyways, which are spaced 180° apart, co-operate with corresponding axially extending keys 21 provided on the boring bar spigot 5. The boring head is axially located on the boring bar by means of two countersunk screws 22. These screws, which are provided with conical heads 23, extend with clearance through countersunk holes 24 provided in the body member and engage screw-threaded blind bores 25 provided in the boring bar spigot 5. The countersunk portion 26 of each bore 24 is eccentrically disposed relative to the remainder of the bore so that as the set screws 22 are tightened a wedging action takes place between the conical heads 23 and the countersunk portions 26 which axially displaces the boring head relative to the boring bar and ensures that the base of the socket 4 is drawn into contact with the adjacent end of the spigot 5. In deep boring machines it is conventional to provide a drilling down the centre of the boring bar and boring head through which a liquid which cools and lubricates the boring operation is passed. As can be seen from FIG. 8, the boring bar 6 is provided with such a drilling 27 and the boring head also includes a drilling 28 which emerges through the outer surface of the boring head at four locations, two of which are shown in FIG. 1 at 29. In order to seal the joint between the boring head and boring bar against the escape of the lubricating and cooling fluid, an O-ring 30 is partially recessed into the ends of the boring bar spigot 5 and is arranged to contact the base of the socket 4 when the set screws 22 are tightened.

As previously described, the body member 1 is provided with a recess 2 in which tools may be clamped by the clamping head 3. With the arrangement shown in FIGS. 1 and 2, the boring head may be arranged to support two tools disposed 180° apart. This enables the boring head to perform two counterboring operations simultaneously, as one tool can be arranged to perform a rough counterboring operation and the other tool can be arranged to perform the final counterboring operation. The use of two boring tools 180° apart in this manner also helps to minimise the problem of vibration during deep counterboring and this symmetrical arrangement results in a more balanced boring head. If desired the body member can be arranged to support more than two tools, these preferably being located at equally circumferentially spaced locations on the body member. These tools may be spaced axially on the body member if desired.

The tool clamping head 3, shown in FIGS. 6 and 7, with which the tools are clamped in the recess 2 comprises a plate 31 which is secured to the end of the body member 1 by four bolts (not shown) which extend through apertures 32 provided in the plate 31 and engage screw-threaded blind bores 33 provided in the body member. The side of the plate 31 adjacent the body member is recessed at 34 to receive two tools, the recess 34 co-operating with the recess 2 in the body member so that the tools are partially recessed into the plate and body member. Four clamping bolts 35 extend through screw-threaded bores 36 in the plate 31, two bolts 35 being arranged to contact and clamp each tool against the body member. Locating pegs 37 provided on the plate extend into small sockets 38 in the end of the body member in order to ensure that the plate and body member are maintained in their correct relative positions.

In FIG. 7 two counterboring tools 39 and 40 are shown aligned with the portions of the recess 34 arranged to accept them. When the tools are in their operating positions within the recess 34 the ends 41 and 42 of the tools will contact the faces 43 and 44 of the plate respectively.

Figure 9:
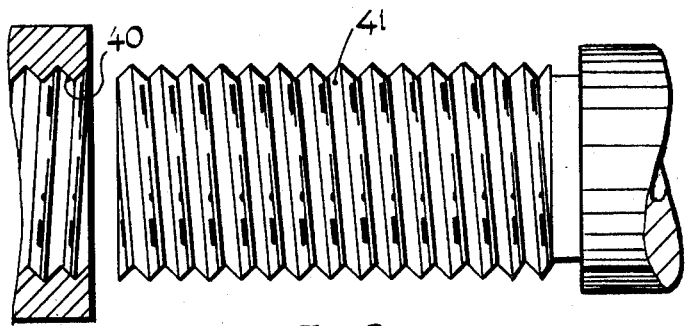
FIG. 9 is a side view of an alternative boring bar end arrangement.

As an alternative to the set-screw arrangement described above for securing the boring head to the boring bar, the boring head may simply be provided with an internally screw-threaded socket arranged to receive a correspondingly screw-threaded portion of the boring bar. In such an arrangement, which is illustrated in FIG. 9, the screw-threaded socket indicated at 40 will be so arranged that rotation of the boring bar 41 during a boring operation tends to screw the boring bar into the socket.

As a further alternative, not shown, the end of the boring bar may be frusto-conical in form and received in a corresponding frusto-conical recess in the boring head. Relative rotation and axial movement between the boring bar and head may again be prevented by keys, slots and countersunk screws as previously described with reference to the construction shown in FIGS. 1 to 8, the keys and slots being provided on the conical surfaces of the boring bar and head respectively.

Figure 10:
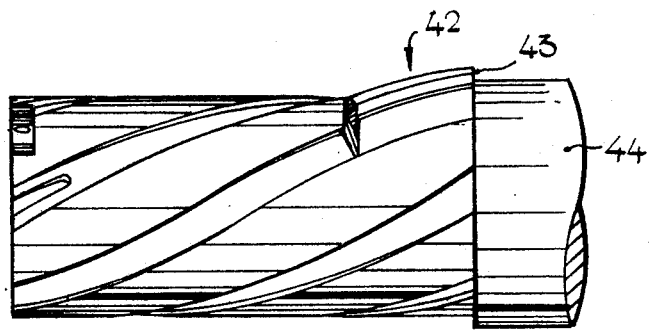
FIG. 10 is a side view on a reduced scale of part of an alternative boring head arrangement employing part helical guidance members for use in counterboring deep holes.

Although in the arrangement described in detail above the guidance members of the boring head extend in directions substantially parallel to the intended direction of boring the guidance members and their associated slots may extend in directions which are inclined to the intended direction of boring. For example, as shown in FIG. 10, the guidance members 42 and their co-operating slots may be part-helical in form so that if a line were to be drawn along the outer surface of the boring head in a direction parallel to the intended direction of boring such a line would touch or cut at least two of the guidance members. Such an arrangement may again employ tapered guidance members and slots as described above, the ends 43 of the guidance members remote from the tool or tools again being contacted by an internally-threaded adjustment sleeve 44 of the form described above.

The use of part-helical guidance members as described above provides a greater degree of support for the boring head when the head is counterboring a hole whose surface has an axially extending discontinuity such as an axially extending keyway. As the part-helical guidance members will not extend parallel to such a keyway they will not tend to enter the keyway as might be the case if the guidance members and keyway were parallel.

When it is intended to use a deep boring head as described above to counterbore a deep hole, a different tool and head arrangement may first be used to provide a pilot counterbore of the required diameter which is deep enough to take the deep boring head as described above. The deep boring head is then inserted into this pilot counterbore and the radial positions of the guidance members adjusted using the sleeve 12 in order to ensure that the bearing strips 8 contact the surface of the pilot counterbore. The counterboring operation is then continued using the deep boring head which is guided as previously described by the guidance members.

In addition to enabling the easy setting-up of the boring head for operation, the ability to adjust the radial positions of the guidance members enables one boring head to be capable of counterboring a range of hole diameters. This range can be further extended by fitting bearing strips mounted on thicker shoes.

Although the invention has been described above in relation to a boring head for use in counterboring an existing deep hole it will be understood, as mentioned previously, that the invention is applicable to boring heads for performing the simple boring operation of boring a hole in a formerly solid workpiece or to boring heads which are capable of performing simple boring and counterboring operations simultaneously.

I claim:

1. A deep hole boring head comprising a body member arranged to support a boring head at one end and to be attached to a boring bar at the other end, a number of guidance members each comprising a strip of low friction material mounted on a dove-tail cross-section tapered shoe, each shoe being respectively slidable in a dove-tail cross-section slot whose depth increases from one end of the slot to the other, adjustment means arranged to displace the guidance members longitudinally within their slots in order to adjust the radial distances of the guidance members from the centre line of the hole to be bored, and a screw carried by each guidance member and arranged to engage the body member, after each guidance member has been adjusted into the desired position relative to the body member, to prevent friction between the guidance members and the surface of the hole bored by the boring head causing the guidance members to be withdrawn from their slots when the boring head is withdrawn from a hole after a boring operation.

* * * * *